No. 654,472. Patented July 24, 1900.
G. A. MAYER.
HUB ATTACHING DEVICE.
(Application filed Feb. 3, 1900.)
(No Model.)
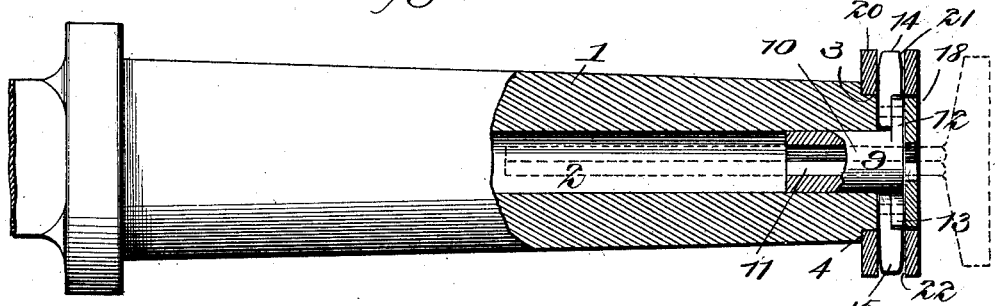
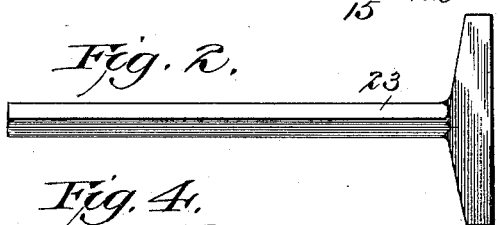
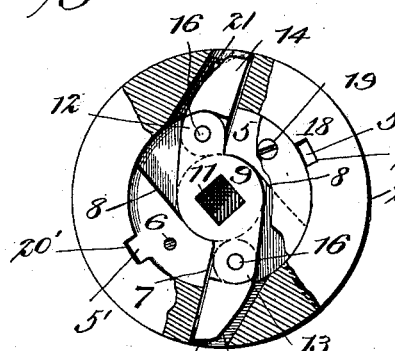
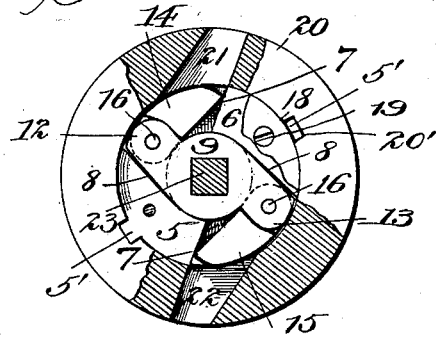
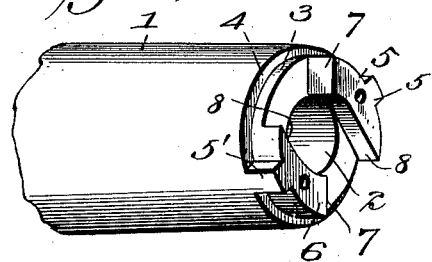
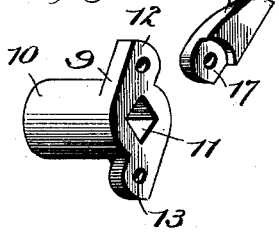
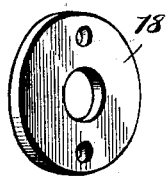
Witnesses
Inventor
George A. Mayer
by Geo. A. Hamlin
His Attorney.

UNITED STATES PATENT OFFICE.

GEORGE A. MAYER, OF HOMESTEAD, PENNSYLVANIA.

HUB-ATTACHING DEVICE.

SPECIFICATION forming part of Letters Patent No. 654,472, dated July 24, 1900.

Application filed February 3, 1900. Serial No. 3,877. (No model.)

*To all whom it may concern:*

Be it known that I, GEORGE A. MAYER, a citizen of the United States, residing at Homestead, county of Allegheny, State of Pennsylvania, have invented certain new and useful Improvements in Hub-Attaching Devices, of which the following is a specification.

This invention relates to hub-attaching devices.

My invention is designed particularly for use on the spindles of vehicle-axles for the purpose of retaining the wheel-hub thereon, although adaptable to other uses, the object being to provide an improved locking device of simple, strong, and durable construction which is adapted to be locked by a suitable key, and thus made to positively engage the nut and secure it rigidly on the spindle and prevent it from becoming loosened in any way by the action of the hub or to be unlocked to permit removal of the hub for inspection, lubrication, or repairs.

The invention consists of certain improved features of construction and combinations of parts, more fully described hereinafter, and recited in the appended claims.

In the accompanying drawings, Figure 1 is a view in longitudinal section of a spindle equipped with my improvements; Fig. 2, a view of the locking and unlocking key. Fig. 3 is an end view showing the nut partly in section and the retaining plate or washer broken away, with the latches in locking position; Fig. 4, a similar view, but with the latches retracted; Fig. 5, a perspective view of the end of the spindle; Fig. 6, detail views of the rocker-tumbler and a latch; Fig. 7, a detail view of the retaining plate or washer.

The spindle 1 is made hollow, as at 2, and its end is reduced and left blank at 3 to provide a shoulder 4 for the nut to abut. On the end of the spindle are lugs 5 and 6, disposed diametrically opposite each other and provided at one end with cam-shoulders 7, also disposed diametrically opposite each other. The inner faces 8 of the lugs are straight and preferably disposed in tangential relation to the circular bore 2, and the outer faces are provided with projections 5. There is a rocker-tumbler 9, having a cylindrical barrel 10, provided with a polygonal-shaped key-opening 11, and arms 12 and 13 projecting from its opposite sides.

The numerals 14 and 15 designate duplicate latches, which are square in cross-section and are pivoted at one end to the respective arms 12 and 13 on pivots 16, the latches being cut away at 17, so that their ends can fit underneath the arms and allow the outer faces of the latches to lie flush with the outer faces of the arms. The cylindrical barrel 10 is of suitable size to fit snugly in the bore 2 in a manner to permit it to turn freely therein, while the arms and latches are free to play in the spaces intervening the lugs 5 and 6.

A circular plate or washer 18 of the same diameter as the reduced end of the spindle and secured to the outer flat faces of the lugs by screws 19 holds the locking mechanism in position, while permitting it to turn.

The nut 20 fits snugly on the reduced end 3 of the spindle and against the shoulder 4, and it is provided with diametrically-disposed inclined apertures 21 and 22 of the same size and shape as the latches and adapted to snugly receive them when they are projected. It also has notches 20' to receive the projections 5'.

The key 23 has a square stem which is adapted for insertion through the hole in washer 18 and into the key-opening 11. When the key is fitted into the cylindrical barrel and turned, the rocker-tumbler is made to turn in the spindle, whereupon the latches 14 and 15 are advanced, and being made to wipe against the cam-shoulders 7 on the lugs are positively guided into the apertures 21 and 22 in the nut until the arms on the rocker-tumbler abut the faces 8 of the lugs. The nut will then be firmly locked on the spindle, and the key can be withdrawn. A reverse movement of the key unlocks the nut by withdrawing the latches from the apertures therein. This reverse movement of the rocker-tumbler is limited by the arms' abutting faces 8. The provision of the notches 20' and projections 5' insures the correct positioning of the nut on the spindle to receive the latches and takes the strain off the latter, while at the same time preventing any rotation of the nut.

Having thus described my invention, what

I claim as new, and desire to secure by Letters Patent, is—

1. In a device of the class described, the combination with a spindle, of a nut thereon, and a rocker-tumbler rockably mounted on the spindle, having pivoted latches adapted for engaging and locking the nut.

2. In a device of the class described, the combination with a spindle, of a nut thereon, a rocker-tumbler rockably mounted on the spindle, latches pivoted to the rocker-tumbler adapted to engage and lock the nut, and guiding devices on the spindle for guiding the movement of the latches.

3. In a device of the class described, the combination with a spindle, of a nut thereon, a rocker-tumbler rockably mounted on the spindle, latches pivoted to the rocker-tumbler adapted to engage and lock the nut, and lugs on the spindle having cam-shoulders against which the latches wipe when the tumbler is turned, whereby said latches are guided into and out of engagement with the nut.

4. In a device of the class described, the combination with a spindle, of a nut thereon, a rocker-tumbler rockably mounted on the spindle and having arms, means carried by the arms for engaging and locking the nut, and lugs on the spindle constituting abutments for the arms to limit their movements in both directions.

5. In a device of the class described, the combination with a spindle, of a nut thereon, a rocker-tumbler on the spindle, latches pivoted to the rocker-tumbler and adapted to engage and lock the nut, and lugs on the spindle which constitute abutments for the rocker-tumbler to limit its movements in both directions and against which the latches wipe whereby they are guided in their movements.

6. In a device of the class described, the combination with a spindle, of a nut thereon having openings therein, a rocker-tumbler on the spindle, and latches pivoted to the rocker-tumbler which are adapted to enter the openings in the nut when the tumbler is rocked in one direction and to retract from said openings when it is rocked in the opposite direction.

7. In a device of the class described, the combination with a spindle, of a nut thereon having openings, a rocker-tumbler on the spindle having opposite arms, latches pivoted to the respective arms of the rocker-tumbler and adapted to enter the openings in the nut when the tumbler is rocked in one direction and to retract from them when it is rocked in the opposite direction, and oppositely-arranged lugs on the spindle which constitute limiting-abutments for the arms of the rocker-tumbler and between which said arms and the latches are adapted to play during their movements.

8. In a device of the class described, the combination with a hollow spindle having a reduced end, of a nut fitted over said reduced end and abutting the shoulder formed thereby, said nut having openings, a rocker-tumbler having a cylindrical barrel provided with a key-opening and fitted in the hollow or bore of the spindle and adapted to turn therein, said rocker-tumbler having opposite arms, latches pivoted to said arms, opposite lugs on the end of the spindle which constitute abutments for the limiting of the play of the arms aforesaid and said lugs having cam-shoulders against which the latches wipe, whereby they are guided into and out of the openings in the nut, and an apertured plate or washer secured to the outer faces of the lugs which retains the rocker-tumbler and latches in position.

9. In a device of the class described, the combination with a spindle having projections thereon, of a nut having openings to receive said projections, whereby the nut is locked against turning on said spindle, said nut also being provided with latch-receiving openings, a rocker-tumbler on the spindle, and latches on said tumbler adapted for projection into the latch-receiving openings of the nut.

In testimony whereof I hereunto affix my signature in presence of two witnesses.

GEORGE A. MAYER.

Witnesses:
JEROME SULLIVAN,
MICHAEL FISHER.